C. P. GREENE.
CHURNS.

No. 194,145. Patented Aug. 14, 1877.

WITNESSES: INVENTOR:
Francis McArdle C. P. Greene.
J. H. Scarborough BY Munn & Co
ATTORNEYS.

UNITED STATES PATENT OFFICE.

CHARLES P. GREENE, OF PROVIDENCE, RHODE ISLAND.

IMPROVEMENT IN CHURNS.

Specification forming part of Letters Patent No. 194,145, dated August 14, 1877; application filed July 13, 1877.

*To all whom it may concern:*

Figure 1:
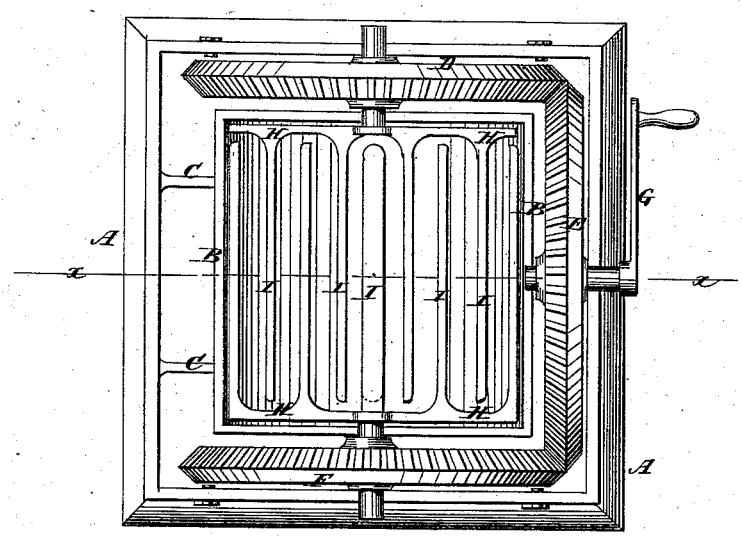
Figure 2:
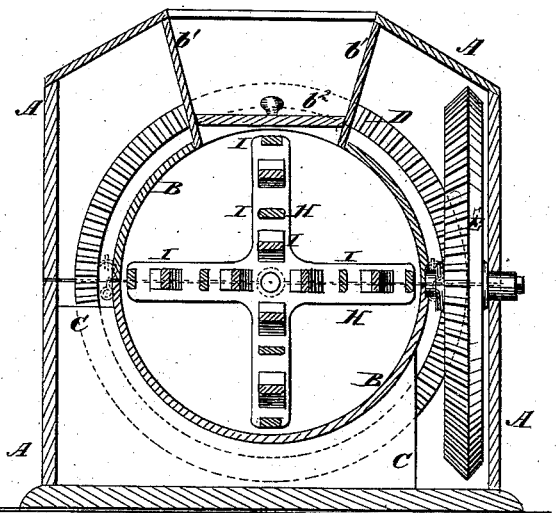

Be it known that I, CHARLES PHILO GREENE, of Providence, in the county of Providence and State of Rhode Island, have invented a new and useful Improvement in Churning Apparatus, of which the following is a specification:

Figure 1 is a top view of my improved churning apparatus, the upper part of the case and of the churn-body being removed. Fig. 2 is a vertical cross-section of the same, taken through the line $x\,x$, Fig. 1.

Similar letters of reference indicate corresponding parts.

The object of this invention is to furnish an improved churning apparatus which shall be so constructed as to bring the butter in a very short time, and develop all the butter there may be in the milk, and which shall be simple in construction, convenient in use, and easily operated.

The invention consists in an improved churning apparatus, formed of the case made in two parts, and provided with the partitions concaved upon their upper sides, the churn-body made in two parts, and provided with the hopper and the lid, the three bevel-gear wheels, the crank, and the two dashers, as hereinafter fully described.

A is the outer case or box of the churn, which is made in two parts, secured to each other by hooks and staples, or other convenient fastenings. In the center of the top of the case A is formed an opening, corresponding in size with the size of the hopper $b^1$ of the churn-body B.

The churn-body B is made cylindrical in form, and rests upon, and is secured to, the concaved upper sides of two or more partitions, C, secured in the lower part of the case A. The churn-body B is made in two equal parts, so that the upper half may be removed for convenience in removing the dashers and taking out the butter.

The churn-body B is made smaller than the case A, so as to leave spaces between its ends and sides and the ends and sides of the case A. Three of these spaces are designed to receive the three bevel-gear wheels D E F, and the fourth space may be used as an ice-box for cooling the milk when desired.

The end gear-wheels D F are made a little longer than the ends of the churn-body B, so that their teeth may mesh into the teeth of the side gear-wheel E.

The journals of the side gear-wheel E revolve in notches in the adjacent edges of the case A and churn-body B, and the outer journal projects and is squared off to receive the crank G, by means of which the churn is operated.

The journals of the end gear-wheels D F revolve in notches in the adjacent edges of the parts of the case A and churn-body B.

The inner journals of the end wheels D F project, and to them, or to hubs attached to them, are attached four, more or less, radial arms, H, to each of which are attached two or more horizontal bars or paddles, I.

The paddles I of the two sets of arms H are so arranged as to pass each other as they move in opposite directions. The outer paddles I, or flexible wings of some suitable material attached to them, move close to the inner surface of the churn-body B, so as to brush off any thick milk that may adhere to said surface, and insure the proper agitation of all the milk.

In using the machine the milk is poured in through the hopper $b^1$, which is then closed by a lid, $b^2$, fitting into its lower part. When the churning is finished the upper parts of the case A and churn-body B are removed, which allows the end wheels D F and the dashers H I to be lifted out, so that the butter can be readily taken out, and the churn conveniently cleaned.

If desired, the gearing may be so arranged as to cause the two dashers H I to move in the same direction, and at different velocities; but I prefer the construction shown and described as producing a better effect.

Having thus described my invention, I claim as new and desire to secure by Letters Patent—

An improved churning apparatus, formed of the case A, made in two parts and provided with the partitions C, concaved upon their upper sides, the churn-body B, made in two parts, and provided with the hopper $b^1$ and the lid $b^2$, the three bevel-gear wheels D E F, the crank G, and the two dashers H I, substantially as herein shown and described.

CHARLES PHILO GREENE.

Witnesses:
 JOSEPH S. G. COBB,
 ALBERT G. KNOWLES.